US011195060B2

(12) United States Patent
Frank

(10) Patent No.: US 11,195,060 B2
(45) Date of Patent: Dec. 7, 2021

(54) VISUALIZATION OF SUBIMAGE CLASSIFICATIONS

(71) Applicant: Steven Frank, Framingham, MA (US)

(72) Inventor: Steven Frank, Framingham, MA (US)

(73) Assignee: ART EYE-D ASSOCIATES LLC, Framingham, MA (US)

(*) Notice: Subject to any disclaimer, the term of this patent is extended or adjusted under 35 U.S.C. 154(b) by 21 days.

(21) Appl. No.: 16/904,666

(22) Filed: Jun. 18, 2020

(65) Prior Publication Data

US 2021/0004650 A1  Jan. 7, 2021

Related U.S. Application Data

(60) Provisional application No. 62/870,976, filed on Jul. 5, 2019.

(51) Int. Cl.
*G06T 7/00* (2017.01)
*G06K 9/62* (2006.01)
(Continued)

(52) U.S. Cl.
CPC .......... *G06K 9/6277* (2013.01); *G06T 7/0002* (2013.01); *G06T 7/11* (2017.01); *G06T 7/136* (2017.01); *G06T 2207/10024* (2013.01)

(58) Field of Classification Search
CPC ............. G06K 9/00127; G06K 9/4628; G06K 9/6277; G06K 9/6274; G06K 2209/05;
(Continued)

(56) References Cited

U.S. PATENT DOCUMENTS

| 2008/0273787 A1* | 11/2008 | Ducksbury | ............... G06T 7/90 |
| | | | 382/133 |
| 2009/0080731 A1* | 3/2009 | Krishnapuram | ..... G06K 9/6231 |
| | | | 382/128 |

(Continued)

FOREIGN PATENT DOCUMENTS

WO   WO-2019183596 A1 *  9/2019   ........... G06K 9/6277

OTHER PUBLICATIONS

Coudray, et al., "Classification and mutation prediction from non-small cell lung cancer histopathology images using deep learning", Nature Medicine | vol. 24 | Oct. 2018 | 1559-1567 (https://doi.org/10.1038/s41591-018-0177-5) (Year: 2018).*

(Continued)

*Primary Examiner* — Li Liu

(57) ABSTRACT

Large digital images are classified by analyzing them at a subimage level and assigning classification probabilities to the subimages; these may be combined into a classification probability for the entire image. Classification probabilities may be visualized across the image using probabilities computed for the subimages. This enables ready identification of the image subregions upon which classification is based as well as the classification scores or probabilities associated therewith. For example, a large source image—too large to be analyzed directly by a neural network—may be decomposed into smaller subimages such as square tiles, which are sifted based on a visual criterion. The visual criterion may be image entropy, density, background percentage, or other discriminator. A neural network produces tile-level classifications that are aggregated to classify the source image, and overlapping tiles are used to create a probability map showing subimage probabilities.

20 Claims, 2 Drawing Sheets

(51) Int. Cl.
*G06T 7/136* (2017.01)
*G06T 7/11* (2017.01)

(58) Field of Classification Search
CPC ......... G06K 9/00147; G06K 2209/051; G06K 9/0014; G06K 9/00536; G06K 9/6267; G06T 7/0002; G06T 7/0012; G06T 7/11; G06T 7/136; G06T 2207/10024; G06T 2207/10056; G06T 2207/20021; G06T 2207/20076; G06T 2207/20081; G06T 2207/20084; G06T 2207/30024; G06T 2207/30096; G06T 7/0014
See application file for complete search history.

(56) References Cited

U.S. PATENT DOCUMENTS

| | | | | |
|---|---|---|---|---|
| 2016/0140716 | A1* | 5/2016 | Kadir | G06T 7/30 382/131 |
| 2016/0350912 | A1* | 12/2016 | Koide | G06T 7/0012 |
| 2017/0161894 | A1* | 6/2017 | Fisher | G06T 7/11 |
| 2018/0082153 | A1* | 3/2018 | Wan | G06K 9/6259 |
| 2018/0129911 | A1 | 5/2018 | Madabhushi et al. | |
| 2018/0232883 | A1 | 8/2018 | Sethi et al. | |
| 2018/0253590 | A1* | 9/2018 | Lloyd | G01N 33/4833 |
| 2019/0147592 | A1 | 5/2019 | Yu | |
| 2019/0206056 | A1* | 7/2019 | Georgescu | G06N 7/005 |
| 2019/0213443 | A1* | 7/2019 | Cunningham | G06K 9/78 |
| 2019/0333222 | A1* | 10/2019 | Gatti | G06K 9/6277 |
| 2020/0311931 | A1* | 10/2020 | Yeh | G06K 9/4628 |
| 2021/0050094 | A1* | 2/2021 | Orringer | G01N 21/65 |

OTHER PUBLICATIONS

Michalak, Hubert, and Krzysztof Okarma. "Improvement of image binarization methods using image preprocessing with local entropy filtering for alphanumerical character recognition purposes." entropy 21.6 (2019): 562.*

Oliveira, Henrique, and Paulo Lobato Correia. "Automatic road crack segmentation using entropy and image dynamic thresholding." 2009 17th European Signal Processing Conference. IEEE, 2009.*

Akkus, Z., Galimzianova, A., Hoogi, A., Rubin, D.L., Erickson, B.J., 2017. Deep Learning for Brain MRI Segmentation: State of the Art and Future Directions. J. Digit. Imaging.

Garcia-Garcia, A., Orts-Escolano, S., Oprea, S.O., Villena-Martinez, V., Garcia-Rodriguez, J., 2017. A review on deep learning techniques applied to semantic segmentation. arXiv.

Havaei, M., Davy, A., Warde-Farley, D., Biard, A., Courville, A., Bengio, Y., Pal, C., Jodoin, P.M., Larochelle, H., 2017. Brain tumor segmentation with Deep Neural Networks. Med Image Anal.

Kleczek, P., Jaworek-Korjakowska, J., Gorgon, M., 2020. A novel method fortissue segmentation in high-resolution H&E-stained histopathological whole-slide images. Comput. Med. Imaging Graph.

Xu, J., Luo, X., Wang, G., Gilmore, H., Madabhushi, A., 2016. A Deep Convolutional Neural Network for segmenting and classifying epithelial and stromal regions in histopathological images. Neurocomputing.

Vu, Q. D., Graham, S., To, M. N. N., Shaban, M., Qaiser, T., Koohbanani, N. A., . . . Saltz, J., Oct. 31, 2018, Methods for segmentation and classification of digital microscopy tissue images. ArXiv.

* cited by examiner

VISUALIZATION OF SUBIMAGE CLASSIFICATIONS

CROSS-REFERENCE TO RELATED APPLICATION

This application claims priority to and the benefit of, and incorporates herein by reference in its entirety, U.S. Provisional Patent Application No. 62/870,976, filed on Jul. 5, 2019.

FIELD OF THE INVENTION

The present invention relates, generally, to processing and automated classification of large, high-resolution digital images, and in particular to visually representing classification results at a subimage level.

BACKGROUND

"Deep learning" approaches have been applied to a wide range of medical images with the objective of improving diagnostic accuracy and clinical practice, Many efforts have focused on images that are inherently small enough to be processed by convolutional neural networks (CNNs), or which can be downsampled to a suitable size without loss of fine features necessary to the classification task. In general, CNNs perform best at image sizes below 600×600 pixels; larger images entail complex architectures that are difficult to train, perform slowly, and require significant memory resources. Among the most challenging medical images to analyze computationally are digital whole-slide histopathology images, which are often quite large—10,000 to more than 100,000 pixels in each dimension. Their large size means that even traditional visual inspection by trained pathologists is difficult. To make such images amenable to CNN analysis, researchers have decomposed them into much smaller tiles that are processed individually. A probability framework is applied to the tile-level classifications to classify the slide. The most successful recent studies have achieved performance comparable to that of experienced pathologists.

A longstanding impediment, to clinical adoption of machine-learning techniques is the inability of many such techniques to convey the rationale behind a classification, diagnosis or other output. Black-box models whose reasoning is opaque or impervious to retrospective analysis may pose clinical dangers that outweigh the benefits of a computational approach. Until recently, CNNs have fallen squarely within the black-box category, but techniques such as gradient-weighted class activation maps ("Grad-CAM") have pried the box open, highlighting the image regions important to a CNN classification.

While the ability to visualize regions of an image important to classification is useful, it does not necessarily address clinical acceptance. Grad-CAM images, for example, each represent a minuscule portion of the total slide area. Painstaking analysis of many such images could help validate the proposition that the CNN is "looking" where it should. But for any given slide classification, Grad-CAM cannot realistically illuminate its underlying basis; the Grad-CAM images are too small and a readable map of them superimposed on the slide would be impossibly large. Moreover; identifying which image regions attract the attention of a CNN does not reveal the underlying rationale for a classification—only the pixels on which the classification, whatever its basis, depended most strongly. But the CNN does process every pixel in the image. Attaching the highest classification importance to image regions of lower diagnostic significance does not necessarily undermine the validity of the classification.

Application of CNNs to evaluate authorship of two-dimensional artwork (see, e.g., Frank et al., "Salient Slices: Improved Neural Network Training and Performance with Image Entropy," *Neural Computation,* 32(6), 1222-1237 (2020) (hereafter "Frank et al."), which is incorporated by reference herein) poses similar uncertainties. The "Salient Slices" algorithm may be used to identify visually significant subimage regions of a high-resolution source image based on image entropy. These subimage regions are found to be most meaningful for classification, and a classification of the full image may be assigned by averaging probabilities associated with the subimages derived therefrom. Averaging subimage probabilities in this way provides enhanced accuracy due to beneficial ensemble effects. A straight average, however, does not provide insight into which regions of a test or training image most strongly underlie the overall classification, or identify regions of different authorship within a single painting.

SUMMARY

Embodiments of the present invention provide visualizations of the classification probabilities associated with subimages, as opposed to the entire classified image, enabling ready identification of the image subregions upon which classification is based as well as the classification scores or probabilities associated therewith. For example, a large source image—too large to be analyzed directly by a CNN—may be decomposed into smaller subimages such as square or rectangular tiles, which are sifted based on a visual criterion. The visual criterion may be one or more of image entropy, density, background percentage, or other discriminator. A CNN produces tile-level classifications that are aggregated to classify the source image.

Overlapping subimages represents a useful data-augmentation expedient for training purposes, but also is found to enhance classification accuracy during testing, with the enhancement depending directly on the degree of overlap. In particular, the greater the degree of overlap, the greater will be the number of images that may contribute to the classification of any particular pixel, thereby increasing overall classification accuracy.

In various embodiments, a probability map in accordance herewith color-codes the probabilities assigned to the examined regions of an image. Using a high degree of subimage overlap results in coverage of large, contiguous regions of the image and fine features. Each colored pixel represents the combined (e.g., averaged) classification probabilities over all sifted and classified tiles containing that pixel. Thus, the probability map covers the union of all pixels of all subimages.

Smaller subimages produce finer features. Ultimately the optimal subimage size for creating probability maps is the one that delivers the highest classification accuracy. Unlike Grad-CAM heat maps, probability maps in accordance herewith do not visually rank image regions in terms of classification importance; instead, they highlight all regions relevant to the classification and visually reveal the associated probability levels. In a medical-image context, this representation permits clinicians to readily determine whether a classification is based on the critical anatomy. Conversely, a probability map can reveal relevant anatomy that had not previously been understood to be associated with a diagnosed condition. It can also help focus a clinician's attention on key slide regions to make a non-automated diagnosis. If a training set is large enough to span the full range of morphologies encountered by pathologists, variegated probability maps may provide a useful guide to the subtleties underlying a classification and allow clinicians to identify possible sources of error.

Accordingly, in a first aspect, the invention relates to a method of computationally generating a digital classification image from a digital source image. In various embodiments, the method comprises the steps of computationally generating classification probabilities for subimage regions of the source image; computationally generating a classification map corresponding to the source image, where the classification map includes, for overlapping subimage regions, combined classification probabilities thereof; and computationally generating a digital visualization image from the classification map, where the visualization image visually distinguishes among different classification probabilities of the probability map. The classification probabilities for overlapping subimage regions may be combined, for example, in a straight pixel-by-pixel average, in a weighted pixel-by-pixel average, or the classification probabilities for all subimage regions may be 0 or 1. In various embodiments, the classification probabilities for overlapping subimage regions are combined by summing classification probabilities for each of a plurality of classes and selecting, with a classification probability of 1, the class with the largest probability sum.

The classification map may consist of or comprise, for non-overlapping subimage regions, the classification probabilities thereof, and for overlapping subimage regions, combined classification probabilities thereof. The probabilities may be distinguished by a plurality of different colors each corresponding to a different probability range. For example, the colors may be overlay colors on a monochromatic (e.g., grayscale, line, etc.) version of the source image. The overlapping subimage regions may be obtained by selecting, from a candidate set of subimage regions, the subimage regions having image entropies at least equal to a threshold value. Alternatively, the overlapping subimage regions may be obtained by selecting, from a candidate set of subimage regions, the subimage regions having image entropies between a pair of boundary entropy values.

In another aspect, the invention pertains to an image-processing system for computationally generating a classification image from a source image. In various embodiments, the system comprises a processor; a computer memory; a first image buffer for storing a source image; a tiling module for generating overlapping subimages of the source image; a convolutional neural network, executed by the processor, for computationally generating classification probabilities for the subimages; a mapping module, executed by the processor, for computationally generating, from the classification probabilities, a classification map including, for overlapping subimages, combined classification probabilities thereof (and, if desired, classification probabilities for non-overlapping subimages); and a visualization module, executed by the processor, for computationally generating a digital visualization image from the classification map, where the visualization image corresponds to the source image and visually distinguishes among classification probabilities.

The classification probabilities for overlapping subimage regions may be combined, for example, in a straight pixel-by-pixel average, in a weighted pixel-by-pixel average, or the classification probabilities for all subimage regions may be 0 or 1.

In various embodiments, the mapping module is configured to combine classification probabilities for overlapping subimages by summing classification probabilities for each of a plurality of classes and selecting, with a classification probability of 1, the class with the largest probability sum.

The classification map may consist of or comprise, for non-overlapping subimage regions, the classification probabilities thereof, and for overlapping subimage regions, combined classification probabilities thereof. The visualization image probabilities may be distinguished by a plurality of different colors, each of the colors corresponding to a different probability range. For example, the colors may be overlay colors on a monochromatic (e.g., grayscale, line, etc.) version of the source image.

In some embodiments, the system further includes a subimage analyzer configured to select, from a candidate set of subimages, the subimages having image entropies at least equal to a threshold value or between a pair of boundary entropy values.

DESCRIPTION OF THE DRAWINGS

The foregoing discussion will be understood more readily from the following detailed description of the disclosed technology, when taken in conjunction with the following drawings, in which.

DETAILED DESCRIPTION

Figure 1:
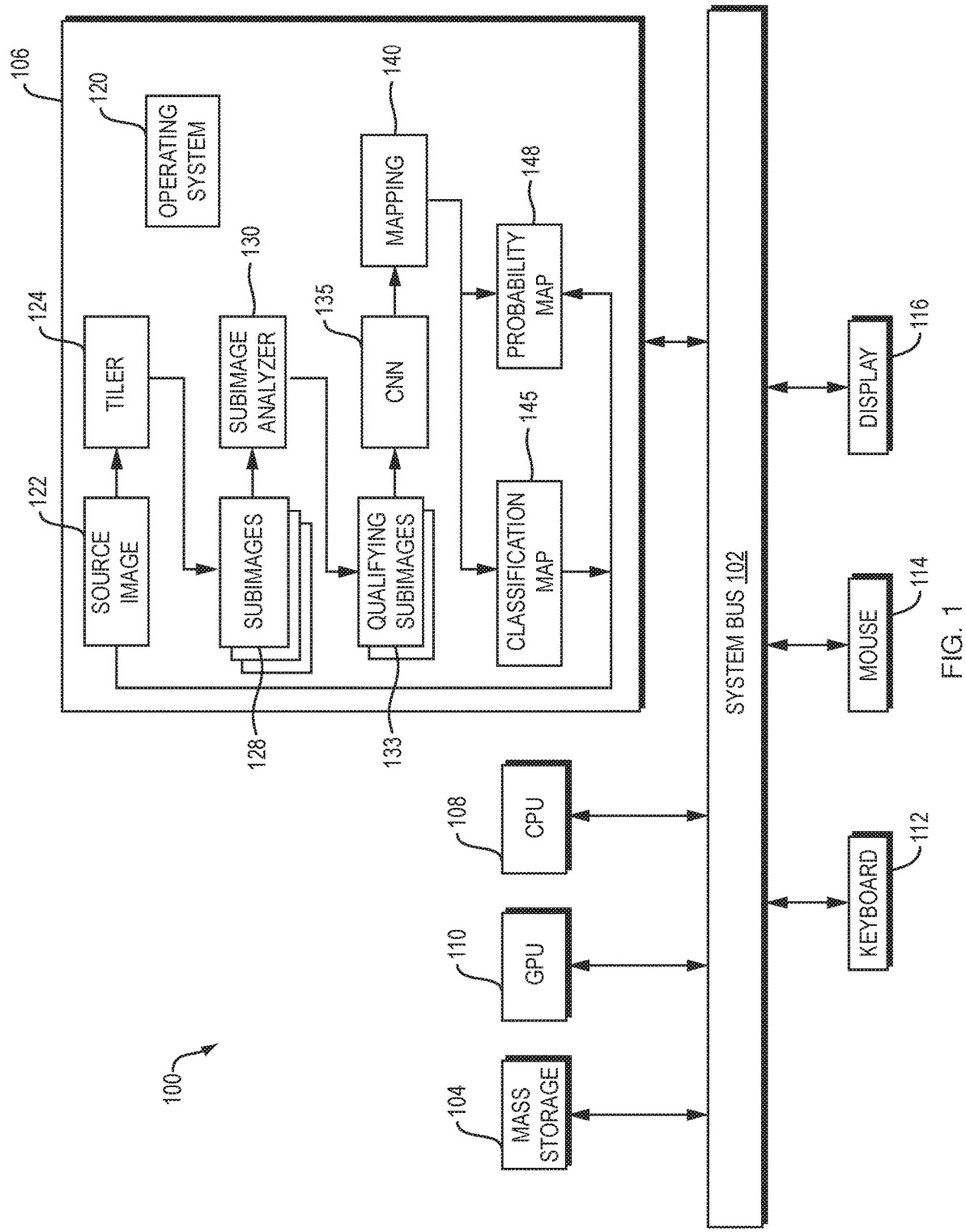
FIG. 1 schematically illustrates a representative hardware architecture according to embodiments of the invention.

Refer first to FIG. 1, which illustrates a representative system 100 implementing an embodiment of the present invention. As indicated, the system 100 includes a main bidirectional bus 102, over which all system components communicate. The main sequence of instructions effectuating the functions of the invention and facilitating interaction between the user and the system reside on a mass storage device (such as a hard disk, solid-state drive or optical storage unit) 104 as well as in a main system memory 106 during operation. Execution of these instructions and effectuation of the functions of the invention are accomplished by a central processing unit ("CPU") 108 and, optionally, a graphics processing unit ("GPU") 110. The user interacts with the system using a keyboard 112 and a position-sensing device (e.g., a mouse) 114. The output of either device can be used to designate information or select particular areas of a screen display 116 to direct functions to be performed by the system.

The main memory 106 contains instructions, conceptually illustrated as a group of modules, that control the operation of CPU 108 and its interaction with the other hardware components. An operating system 120 directs the execution of low-level, basic system functions such as memory allocation, file management and operation of mass storage devices 104. At a higher level, a source image 122, stored (e.g., as a NumPy array) in an image buffer that may be a partition of main memory 106, is processed by a tiler module 124 to produce a plurality of subimage portions (or "tiles") 128 of source image 122 based on a user-specified overlap factor. Tiles 128 may be stored in a storage device 104 along with coordinates specifying their locations in source image 122.

An analyzer 130 sifts subimages 128 according to a visual criterion, as described in greater detail below, to identify the subimages 133 that satisfy the criterion. The qualifying subimages 133 are analyzed by a CNN 135 that has been trained for the classification task of interest. CNN 135 may be straightforwardly implemented without undue experimentation. Python/Keras code for a suitable five-layer CNN architecture may be found at https://github.com/stevenjay-frank/A-Eye, the contents of which are incorporated by reference herein.

CNN 135 computes a classification probability for each qualifying subimage 133. A mapping module 140 builds a classification map 145 by computing the average probability associated with each classified pixel across all subimages that include that pixel, or otherwise combining pixel-level probabilities as described below. From classification map 145, mapping module 140 generates the probability map 148 based on the final probability value of each classified pixel and the color associated with that value. Because only part of the original source image may have associated probability levels (since, usually, not all subimages satisfy the visual criterion), it may be useful for probability map 148 to represent source image 122 as a grayscale (or line or other monochromatic) image with colors overlaid translucently where probabilities were obtained. This is straightforwardly implemented in accordance with well-known techniques.

Classification map 145 and probability map 148 may be stored in memory 106 as data arrays, image files, or other data structure, but need not be distinct. Instead, probability map 148 may be generated directly from the source image (e.g., in grayscale format) and average (or otherwise combined) pixel-level classification probabilities as these are computed—i.e., the probability and classification maps may be the same map.

In one embodiment, tiler 124 generates subimage tiles 128 of specified dimensions from a source image 122 by successive identification of vertically and horizontally overlapping tile-size image regions. The Python Imaging Library, for example, uses a Cartesian pixel coordinate system, with (0,0) in the upper left corner. Rectangles are represented as 4-tuples, with the upper left corner given first; for example, a rectangle covering all of an 800×600 pixel image is written as (0, 0, 800, 600). The boundaries of a subimage of width=w and height=h are represented by the tuple (x, y, x+w, y+h), so that x+w and y+h designate the bottom right coordinate of the subimage.

Figure 2:
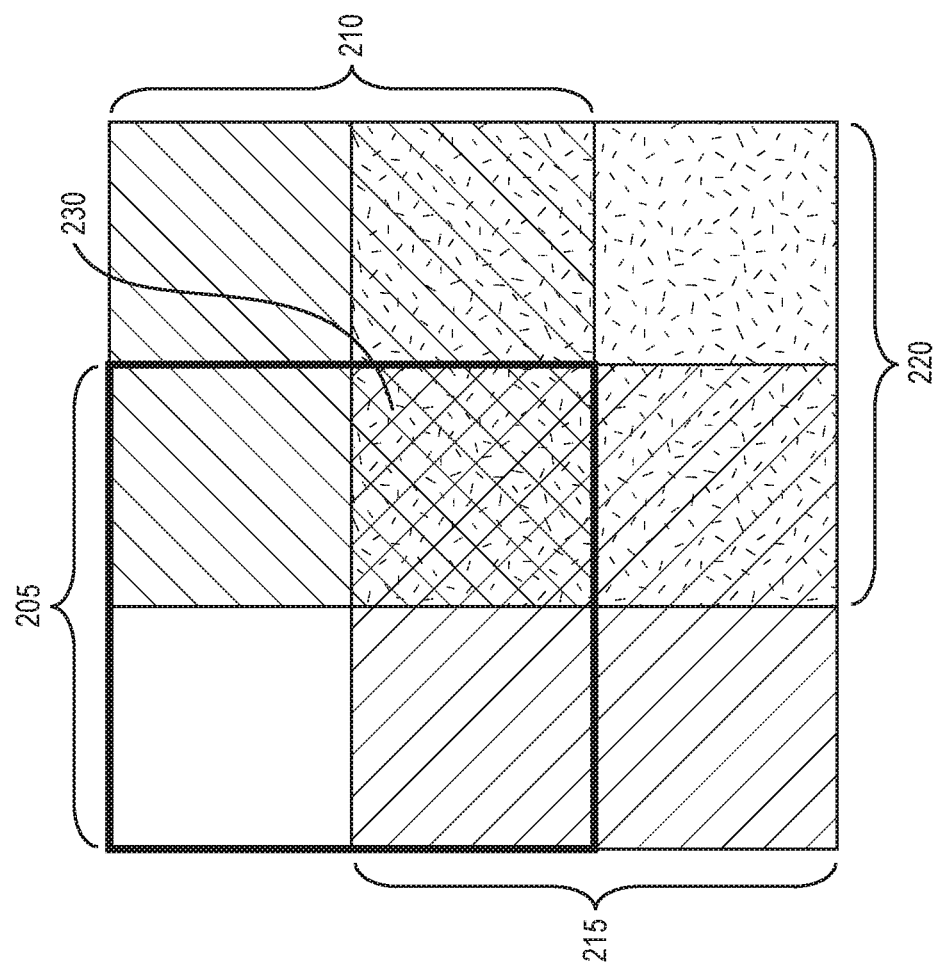
FIG. 2 illustrates two-dimensional overlap among subimages.

The tile overlap factor may be defined in terms of the amount of allowed overlap between vertically or horizontally successive subimages; hence, an overlap factor of ½ results in 50% vertical or horizontal overlap between consecutive subimages. This is illustrated in FIG. 2. Tile pairs 205, 210 and 215, 220 have 50% horizontal overlap (with the border of tile 205 being emphasized for clarity). In addition, tile pair 215, 220 has 50% vertical overlap with tile pair 205, 210. This two-dimensional overlap results in a central region 230 where all four tiles 205, 210, 215, 220 overlap and may contribute, by averaging or other combination, to a classification probability. The greatest number of overlapping images occupy the central region 230, which, as overlap increases, diminishes in size but increases in terms of the number of contributing subimages. More importantly, increasing overlap means that more of the area of any single tile will overlap with one or more other tiles, so that more pixels of any tile will receive probability contributions from other tiles with consequent reduction in classification error; consequently, if only a minority of tiles are misclassified, the effect of overlap by properly classified tiles will overwhelm the misclassification error and the resulting probability map will have high accuracy.

Once the tiles are generated, they are sifted in accordance with a visual criterion with the objective of eliminating tiles that are not meaningful for classification. In one embodiment, the visual criterion is image entropy. From the purview of information theory, image entropy represents the degree of randomness (and therefore information content) of the image pixel values, just as the entropy of a message denotes (as a base-2 log) the amount of useful, nonredundant information that the message encodes:

$$H = -\sum_k p_k \log_2(p_k)$$

In a message, $p_k$ is the probability associated with each possible data value k. For an image, local entropy is related to the complexity within a given neighborhood, sometimes defined by a structuring element such as a circular or square region, or the entire image. Thus, the entropy of a grayscale image (or one channel of a color (e.g., RGB) image) can be calculated at each pixel position (i,j) across the image. To the extent that increasing image entropy correlates with increasingly rich feature content captured in the convolutional layers of a CNN, it provides a useful basis for selecting tiles. In one implementation, only those tiles whose entropies equal or exceed the entropy of the whole image are retained. Although no subimage will contain as much information content as the original, a subimage with comparable information diversity may pack a similar convolutional punch, so to speak, when processed by a CNN. In some embodiments, depending on the distribution of tile entropies, the discrimination criterion may be relaxed in order to increase the number of qualifying tiles. Because of the logarithmic character of the entropy function, even a slight relaxation of the criterion can result in many more qualifying tiles. For example, the criterion may be relaxed by 1% (to retain tiles with image entropies equal to or exceeding 99% of the source image entropy), or 2%, or 3%, or 4%, or 5%, or up to 10%. Tile sifting using image entropy is further described in Frank et al.

Another suitable approach to tile sifting uses a background threshold criterion, retaining only tiles with a proportion of background below a predetermined limit. Images of pathology slides, for example, typically have white or near-white backgrounds. But the tissue of interest may also have white features, gaps or inclusions. Hence, while the presence of any background can adversely affect training and classification accuracy, eliminating all tiles containing regions that might potentially be background risks discarding anatomy critical to classification. Hence, the minimum background threshold is generally set at 50% or higher, e.g., 60%, 70%, 80%, or even 90%; the optimal threshold depends on the amount of background-shaded area that may appear in non-background regions.

One approach to background identification and thresholding is to convert a colored tile to grayscale and count pixels with color values corresponding to background, e.g., white or near-white pixels. For example, an RGB image has three color channels and, hence, three two-dimensional pixel layers corresponding to red, blue, and green image components. In an eight-bit grayscale image, a pixel value of 255 represents white. To allow for some tonal variation from pure white arising from, for example, the source imaging modality, any pixel in any layer with a value above, e.g., 240 may be considered background. Summing the number of such pixels and dividing by the total number of pixels yields the background fraction. Only tiles with background fractions below the predetermined threshold are retained.

Still another suitable visual criterion is image density. If regions of interest for classification purposes are known to have image densities above a minimum, that minimum may be used as a discrimination threshold to sift tiles.

With renewed reference to FIG. 1, once tiles have been sifted and qualifying tiles 133 identified and stored in volatile and/or nonvolatile storage, they are used either to train CNN 135 or are presented to a trained CNN as candidate images for classification. The output of CNN 135 is generally a classification probability. In some instances, the classification is binary (e.g., Rembrandt or not Rembrandt, cancerous or benign, adenocarcinoma or squamous cell carcinoma, etc.) and the decision boundary lies at 0.5, so that output probabilities at or above 0.5 correspond to one classification and output probabilities below 0.5 reflect the other classification. In other instances, there are multiple output classifications and a "softmax" activation function maps CNN output probabilities to one of the classes.

For ease of illustration, consider binary classification of a histology slide that may contain either or both of two types—"type 1" and "type 2"—of cancerous tissue. The slide, possibly after initial resizing (e.g., downsampling to a lower resolution), is decomposed into overlapping subimages 133, which are sifted as described above. The sifted subimages are processed by CNN 135, which has been trained to distinguish between type 1 and type 2 cancers. CNN 135 assigns a classification probability p to each subimage, with probabilities in the range $0.5 \leq p < 1.0$ corresponding to type 1 and probabilities in the range $0 < p < 0.5$ corresponding to type 2. Each individual subimage may contain only a small amount of type 1 or type 2 tissue, yet the entire subimage receives a unitary probability score. As a result, the score assigned to an individual subimage may be skewed so as, for example, to ignore type 1 and/or type 2 tissue that is present but in too small a proportion to trigger the proper classification. With sufficient overlap and pixel-level averaging, this classification error will be mitigated as overlapping subimages containing progressively greater proportions of the type 1 and/or type 2 tissue contribute to the average pixel-level probabilities.

In various embodiments, a pixel-level probability map is defined to reflect average probabilities across all classified subimages. For example, in Python, a 3D m×n×d NumPy array of floats may be defined for an m×n source image, with the parameter d corresponding to the number of classified subimages (which were identified as satisfying a visual criterion). At each level d, the array is undefined or zero except for the region corresponding to one of the classified subimages, and all array values in that 2D region are set to the classification probability computed for the subimage. The probability map is an m×n array, each value [i,j] of which is equal to some combination of all nonzero values [i,j,d:] of the 3D array, e.g., the average of all nonzero values [i,j] over the d-indexed axis. The greater the degree of subimage overlap, the deeper the number of nonzero values will extend through the d-indexed axis and, therefore, the more probability values (from overlapping subimages) that will contribute to the combined value at any point of the probability map, enhancing classification accuracy for that point. Points in the probability map corresponding to points in the 3D array with no nonzero values over the d-indexed axis—i.e., where the source image lacked sufficient image entropy to generate a subimage satisfying the criterion—may be left undefined.

The probability map, therefore, is a map of pixelwise classification probabilities. The probability map may be dense (i.e., have values over most of the source image) or sparse (with relatively few defined values) depending on the amount of visual diversity in the source image and the number of qualifying tiles left after sifting. A painted portrait, for example, may have a probability map with defined values in regions corresponding to the subject's face and elaborate articles of clothing, while pathology images vary markedly in visual density and may be dense or sparse.

The probability map may be color-coded, with different colors assigned to discrete probability ranges. For example, the color coding may follow the visible spectrum, with low probabilities corresponding to blue and high probabilities represented by red, and intermediate probability ranges assigned to intermediate spectral colors. The number of colors used (i.e., how finely the probability range of 0 to 1 is partitioned) depends on the classification task and how meaningful small probability gradations are for the viewer. A relatively small number (e.g., four) may suffice for artwork authentication, since the degree of certainty associated with the probability level assigned to any particular subimage may be lower than the certainty associated with the overall classification; but a larger number (e.g., 10-20) may be used for analysis of medical images, where fine distinctions and explicit confidence levels may be essential for clinical acceptance. Examples of the former are found in Frank et al., "A Neural Network Looks at Leonardo's(?) Salvator Mundi," forthcoming in Leonardo journal and available at arXiv:2005.10600 [cs.CV], which is incorporated herein by reference. Undefined points (i.e., points with no assigned probabilities) may be uncolored.

The classification need not be binary. For example, CNN 135 may be trained with subimages 128 corresponding to three types of tissue, e.g., normal tissue and two distinct types of malignant tumor. Probabilities may be computed according to, for example, a softmax activation function. Pixel-level probabilities from overlapping tiles can be averaged as described above or, because the softmax function is a ratio of exponentials, the mean may be weighted or otherwise adjusted accordingly. More simply, the softmax probabilities associated with each pixel may be summed and the class label corresponding to the largest sum (identified, for example, using the argmax( ) function to select a label index) assigned to the pixel with, for example, a probability of 1. Following these assignments, classification map 145 will have pixels with class labels and associated probability values of 1, and the remaining pixels will have probability values of 0.

If the image to be analyzed is known to contain only one of multiple classifications, the dominant label among labeled pixels—that is, the label with the most pixel assignments—may be identified, and only pixels having that label may be mapped in probability map 148. If the subimage size is small enough, the dominant label can be assessed at a subimage level, and the pixels of classification map 145 corresponding to those of each subimage classified with the dominant label are assigned a probability of 1. These pixels may be assigned a monochromatic color and translucently superimposed over the grayscale version of source image 122 to generate the final probability map 148. Thus, in this case, combining class probabilities means assigning a value of 1 to any pixel intercepted by any number of tiles having the dominant label (and assigning a value of 0 otherwise).

If the image might validly have multiple classifications, on the other hand, these classifications may be mapped in different colors on a single probability. Alternatively, multiple probability maps each colored to show one of the classifications may be generated.

For example, CNN 135 may be trained to discriminate among multiple tumor types, but it is known that any malignant histology sample can contain only one type of tumor. In that case, the image of a new sample may be tiled and sifted, and the sifted tiles presented to CNN 135 for classification. Due to error, the resulting classifications may incorrectly include more than one tumor type. If CNN 135 has been properly trained, the correct classification type will predominate among tiles classified in one of the malignant categories (as opposed to classification as normal tissue). The minority tiles may therefore be ignored and only the dominant tumor tiles mapped. Since the minority tiles are excluded altogether rather than being averaged with the dominant tiles, there is no need for probability-based color coding; the dominant tiles may be overlaid in a single color on a grayscale version of the sample image, producing a tissue segmentation indicating the location and type of tumor in the sample—that is, the union of all dominant tiles will be colored monochromatically in probability map 148.

Alternatively or in addition, image entropy may be used to produce boundary constraints rather than a unitary criterion that either is or is not satisfied. In one implementation, training images are prepared using segmentation masks that occlude non-tumor portions of an image. These masks may be generated manually, by trained pathologists, or in an automated fashion. The masks allow the tumor portions of a slide image to be extracted, and the resulting tumor-only images may be downsampled as described above and their image entropies computed. The maximum and minimum entropies of the images (or, if desired, of tiles created from the images) may be treated as boundaries or "rails" within which a candidate tile must fall in order to qualify as usable. Sifting in accordance with this criterion preliminarily eliminates tiles unlikely to correspond to tumor tissue. Thus, an image of a histology slide to be classified may be downsampled, tiled, and the tiles sifted using the previously established entropy boundaries. If CNN 135 has been trained to distinguish among multiple types of tumor and between tumor and normal tissue, this preprocessing can boost overall accuracy by excluding tissue tiles that might have been misclassified as tumor tiles.

In general, it is noted that computers typically include a variety of computer-readable media that can form part of system memory and be read by the processing unit. By way of example, and not limitation, computer-readable media may take the form of volatile and/or nonvolatile memory such as read-only memory (ROM) and random access memory (RAM). A basic input/output system (BIOS), containing the basic routines that help to transfer information between elements, such as during start-up, is part of operating system 120 and is typically stored in ROM. RAM typically contains data and/or program modules that are immediately accessible to and/or presently being operated on by CPU 110. Operating system 110 may be or include a variety of operating systems such as Microsoft WINDOWS operating system, the Unix operating system, the Linux operating system, the MACINTOSH operating system, the APACHE operating system, or another operating system platform.

Any suitable programming language may be used to implement without undue experimentation the analytical functions described above and in the attached paper. Illustratively, the programming language used may include without limitation, high-level languages such as C, C++, C#, Java, Python, Ruby, Scala, and Lua, utilizing, without limitation, any suitable frameworks and libraries such as TensorFlow, Keras, PyTorch, or Theano. Further, it is not necessary that a single type of instruction or programming language be utilized in conjunction with the operation of the system and method of the invention. Rather, any number of different programming languages may be utilized as is necessary or desirable. Additionally, the software can be implemented in an assembly language and/or machine language.

CPU 108 may be a general-purpose processor, e.g., an INTEL CORE i9 processor, but may include or utilize any of a wide variety of other technologies including special-purpose hardware, such as GPU 110 (e.g., an NVIDIA 2070), a microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of computationally generating a digital classification image from a digital source image, the method comprising the steps of:
   computationally generating classification probabilities for subimage regions of the source image;
   computationally generating a classification map corresponding to the source image, the classification map including, for each subimage region overlapping with another subimage region, combined classification probabilities of pixels where the subimage regions overlap based on, for each such pixel, the classification probabilities of the subimage regions containing the pixel; and
   computationally generating a digital visualization image from the classification map, the visualization image visually distinguishing among different classification probabilities of the classification map.

2. The method of claim 1, wherein the classification probabilities for each pixel in overlapping subimage regions are combined in a straight average of the classification probabilities of the subimage regions containing the pixel.

3. The method of claim 1, wherein the classification probabilities for each pixel in overlapping subimage regions are combined in a weighted average of the classification probabilities of the subimage regions containing the pixel.

4. The method of claim 1, wherein the classification probabilities for all subimage regions are 0 or 1.

5. The method of claim 4, wherein the classification probabilities for overlapping subimage regions are combined by summing classification probabilities for each of a plurality of classes and selecting, with a classification probability of 1, the class with the largest probability sum.

6. The method of claim 1, wherein the probabilities are distinguished by a plurality of different colors, each of the colors corresponding to a different probability range.

7. The method of claim 6, wherein the colors are overlay colors on a monochromatic version of the source image.

8. An image-processing system for computationally generating a classification image from a source image, the system comprising:
a processor;
a computer memory;
a first image buffer for storing a source image;
a tiling module for generating overlapping subimages of the source image;
a convolutional neural network, executed by the processor, for computationally generating classification probabilities for the overlapping subimages;
a mapping module, executed by the processor, for computationally generating, from the classification probabilities, a classification map including, for each subimage overlapping with another subimage, combined classification probabilities of pixels where the subimages overlap based on, for each such pixel, the classification probabilities of the subimages containing the pixel; and
a visualization module, executed by the processor, for computationally generating a digital visualization image from the classification map, the visualization image corresponding to the source image and visually distinguishing among classification probabilities.

9. The system of claim 8, wherein the classification probabilities for each pixel in overlapping subimages are combined in a straight average of the classification probabilities of the subimages containing the pixel.

10. The system of claim 8, wherein the classification probabilities for each pixel in overlapping subimages are combined in a weighted average of the classification probabilities of the subimages containing the pixel.

11. The system of claim 8, wherein the classification probabilities are 0 or 1.

12. The system of claim 11, wherein the mapping module is configured to combine classification probabilities for overlapping subimages by summing classification probabilities for each of a plurality of classes and selecting, with a classification probability of 1, the class with the largest probability sum.

13. The system of claim 8, wherein the visualization image probabilities are distinguished by a plurality of different colors, each of the colors corresponding to a different probability range.

14. The system of claim 13, wherein the colors are overlay colors on a monochromatic version of the source image.

15. A method of computationally generating a digital classification image from a digital source image, the method comprising the steps of:

computationally generating, from the digital source image, a plurality of subimage regions thereof;
selecting a subset of the generated subimage regions, each of the selected subimage regions having an image entropy at least equal to a reference image entropy, wherein (a) the reference image entropy is an image entropy of the digital source image or (b) the selected subimages each have an image entropy no greater than a second reference image entropy greater than the reference image entropy;
computationally generating classification probabilities for the selected subset of subimage regions;
computationally generating classification map corresponding to the source image, the classification map including combined classification probabilities of overlapping subimage regions of the selected subset; and
computationally generating a digital visualization image from the classification map, the visualization image visually distinguishing among different classification probabilities of the classification map.

16. The method of claim 15, wherein the reference image entropy is an image entropy of the digital source image.

17. The method of claim 15, wherein the selected subimage regions each have an image entropy no greater than a second reference image entropy greater than the reference image entropy.

18. An image-processing system for computationally generating a classification image from a source image, the system comprising:
a processor;
a computer memory;
a first image buffer for storing a source image;
a tiling module for generating subimages of the source image;
a subimage analyzer configured to select, from a candidate set of subimages, the subimages having image entropies at least equal to a reference image entropy, wherein (a) the reference image entropy is an image entropy of the digital source image or (b) the selected subimages each have an image entropy no greater than a second reference image entropy greater than the reference image entropy;
a convolutional neural network, executed by the processor, for computationally generating classification probabilities for the selected subimages;
a mapping module, executed by the processor, for computationally generating, from the classification probabilities, a classification map including combined classification probabilities of overlapping ones of the selected subimages; and
a visualization module, executed by the processor, for computationally generating a digital visualization image from the classification map, the visualization image corresponding to the source image and visually distinguishing among classification probabilities.

19. The system of claim 18, wherein the reference image entropy is an image entropy of the digital source image.

20. The system of claim 18, wherein the selected subimages each have an image entropy no greater than a second reference image entropy greater than the reference image entropy.

* * * * *